Oct. 4, 1966 R. J. EBBERT 3,276,275
MOTION TRANSFER MECHANISM
Filed Dec. 11, 1964 4 Sheets-Sheet 1
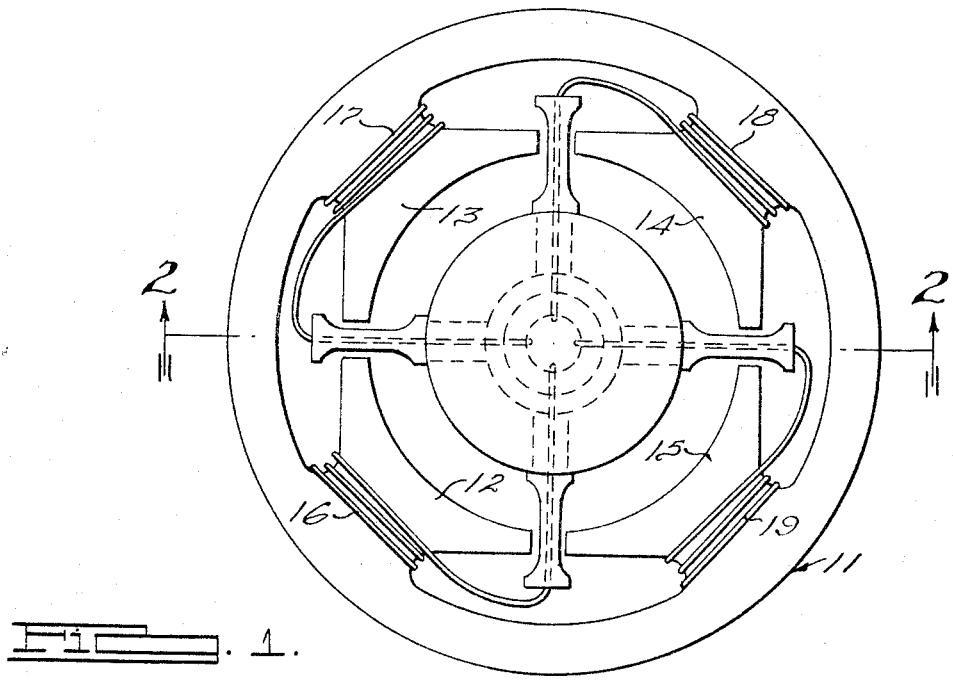
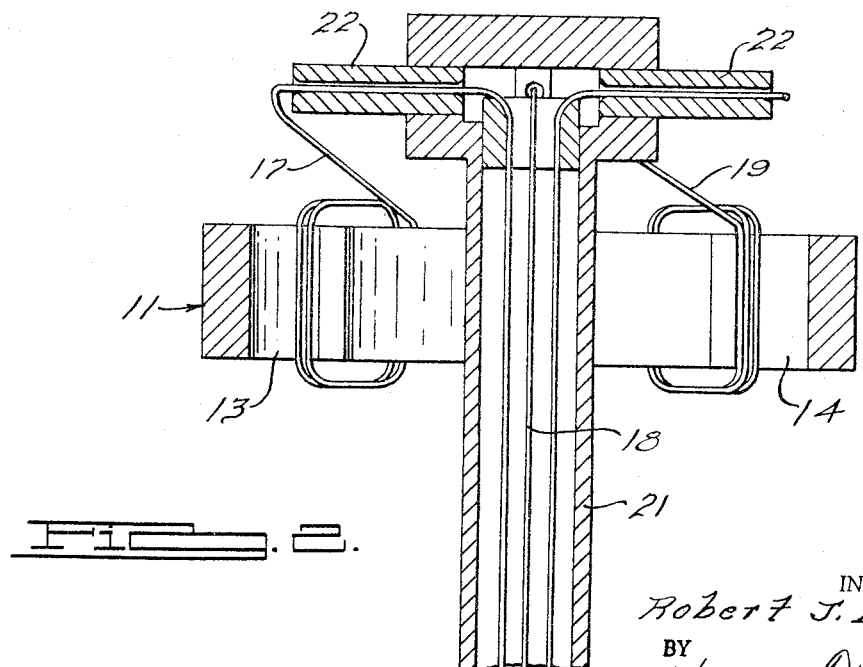
INVENTOR.
Robert J. Ebbert
BY
Carness Dickey Pierce
ATTORNEYS.

Oct. 4, 1966  R. J. EBBERT  3,276,275
MOTION TRANSFER MECHANISM
Filed Dec. 11, 1964  4 Sheets-Sheet 2
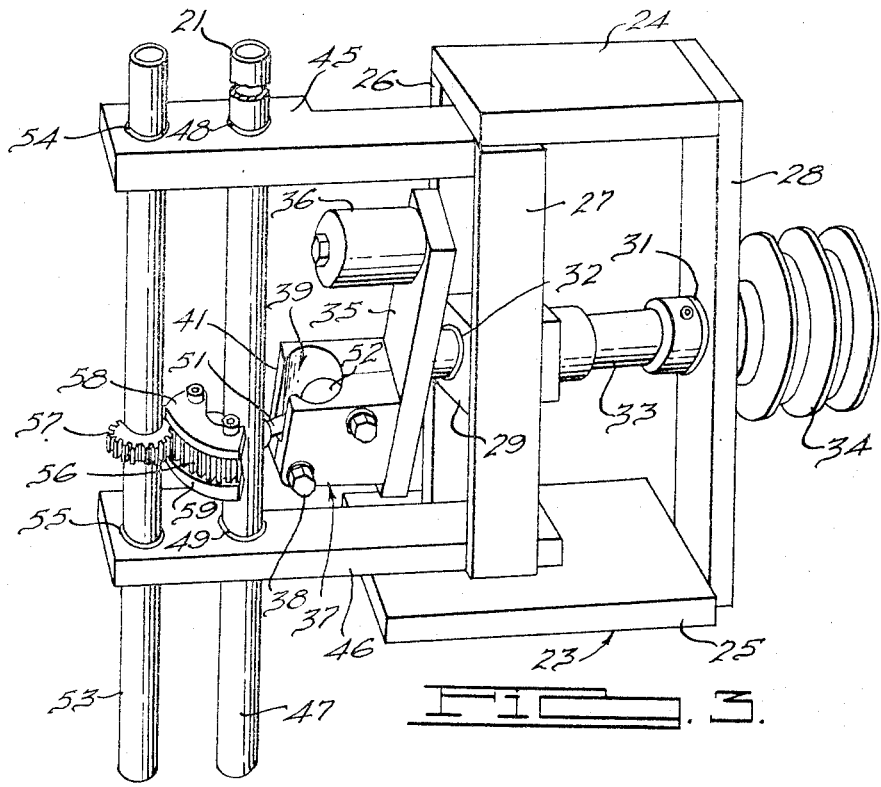
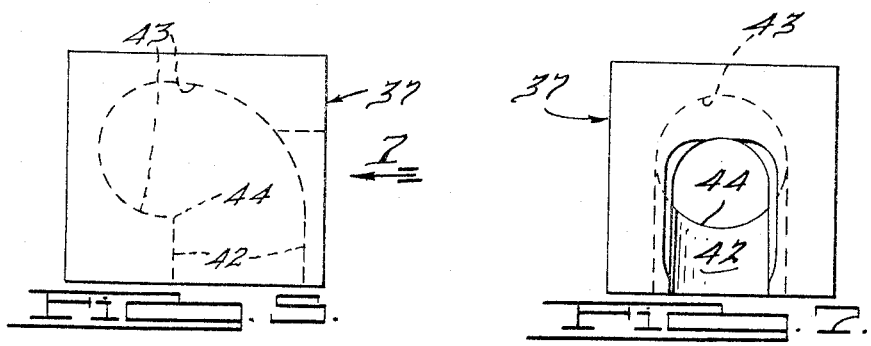
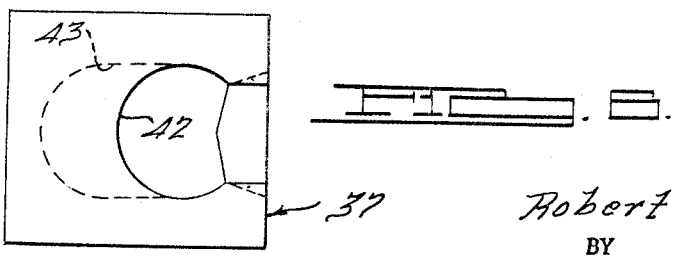
INVENTOR.
Robert J. Ebbert
BY
Harness Dickey & Pierce
ATTORNEYS.

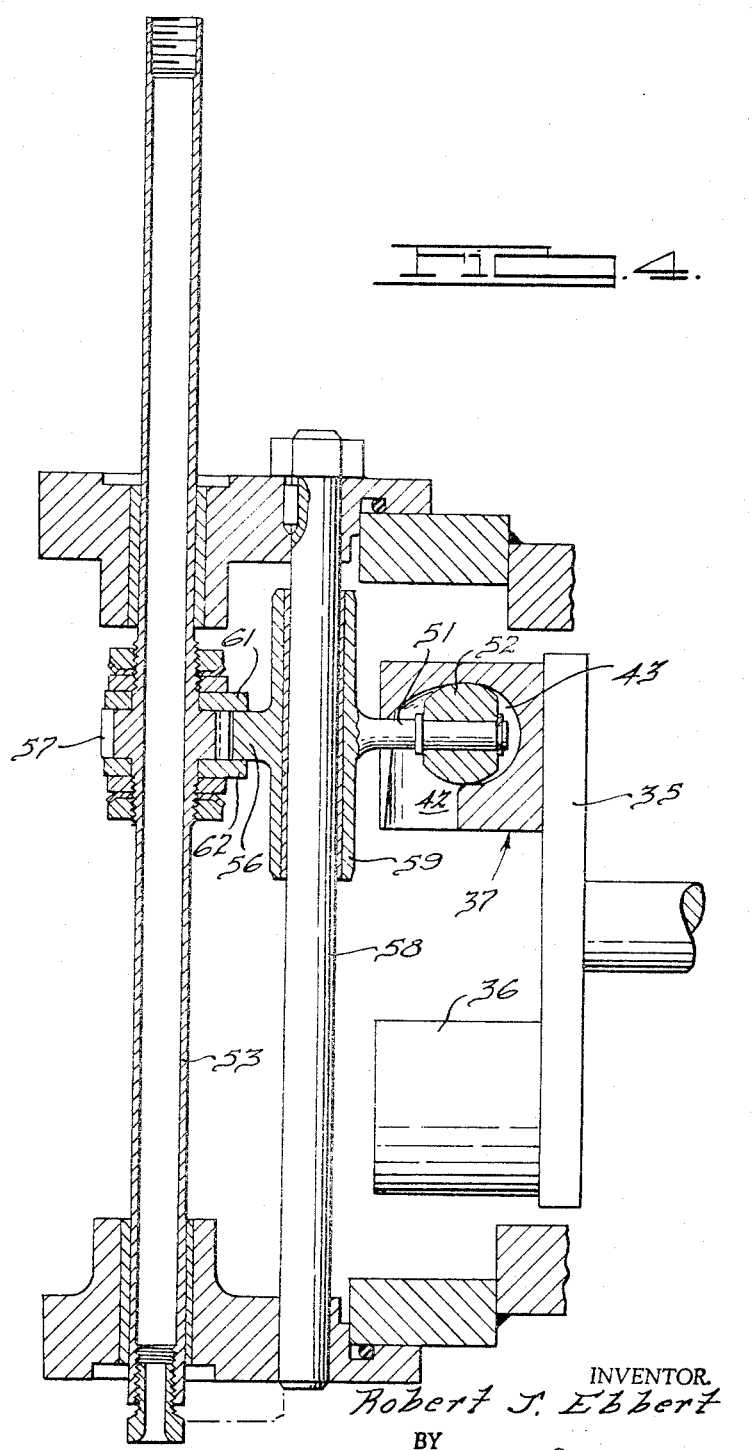

Oct. 4, 1966 R. J. EBBERT 3,276,275
MOTION TRANSFER MECHANISM
Filed Dec. 11, 1964 4 Sheets-Sheet 4

INVENTOR.
Robert J. Ebbert.
BY
Harness Dickey & Pierce
ATTORNEYS.

United States Patent Office 3,276,275
Patented Oct. 4, 1966

3,276,275
MOTION TRANSFER MECHANISM
Robert J. Ebbert, Rochester, Mich., assignor to Ebbert Engineering Company, Troy, Mich., a corporation of Michigan
Filed Dec. 11, 1964, Ser. No. 417,572
6 Claims. (Cl. 74—23)

This invention relates to motion transfer mechanisms, and more particularly to devices for changing rotary motion into motion along a closed path which has two parallel portions connected by arcuate transitional portions. Such a motion transfer mechanism is of particular use, for example, in coil winding machines for electrical machines.

It is an object of the invention to provide a novel and improved motion transfer mechanism of this nature which is of simple and reliable construction, can be operated with extreme rapidity, is easily adjustable, and may be used to wind coils on poles of various angular dimensions.

Other objects, features and advantages of the present invention will become apparent from the subsequent description, taken in conjunction with the accompanying drawings.

In the drawings:

FIGURE 1 is a plan view of a stator for electrical machines showing the manner in which a spindle connected to the present invention winds coils on the poles thereof;

FIGURE 2 is a cross-sectional view in elevation taken along the line 2—2 of FIGURE 1 and showing the construction of the spindle;

FIGURE 3 is a perspective view of the device showing an attachment by means of which coils for two-pole as well as four-pole stators may be wound;

FIGURE 4 is a side elevational view in cross section of a slightly modified device with the ball in its uppermost position;

FIGURE 5 is a side elevational view of the ball guide block;

FIGURE 6 is an end view of the block taken in the direction from the bottom of FIGURE 5;

FIGURE 7 is a side view of the block taken in the direction of the arrow 7 of FIGURE 5.

Figure 10:
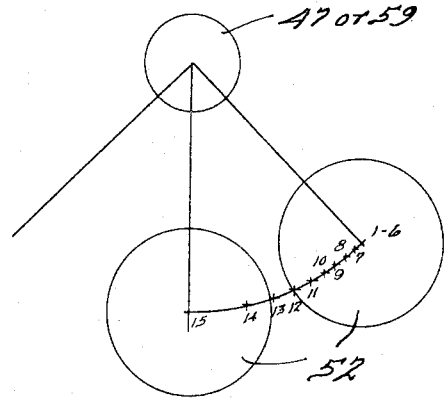
FIGURES 8, 9 and 10 are views from various directions showing the positions of the ball at various points along one-quarter of its path.

Briefly, each of the illustrated embodiments of the invention is intended to operate a spindle carrying a plurality of winding needles which simultaneously wind wire strands onto poles of an electrical machine component, such as a generator stator. The needles must have approximately straight line motion in one direction to pass the poles, arcuate cross motion to the other sides of the poles, straight line motion again to pass the poles, and arcuate cross motion to arrive at the initial position.

The invention comprises a continuously rotatable shaft which carries a crank at one end. A block is fixed to the outer end of this crank, and an L-shaped slot is formed in the block, the slot having a first section which extends radially with respect to the shaft, and a second section which extends transversely from the outer end of the radial portion.

A spindle operating shaft is supported for rotational and axial movement outwardly of the block, this shaft extending at right angles to the axis of the crankshaft. An arm is fixed to the spindle operating shaft and extends perpendicularly therefrom into the slot, the outer end of the arm carrying a spherical member which is disposed within this slot. The cross-sectional shape of the slot is such as to confine the spherical member, but with one side open to clear the arm.

In the illustrated embodiments, the spindle operating shaft is spaced from the axis of the radial section of the slot a distance such that the arm, and therefore the spindle operating shaft itself, will rotate 90° between the straight portions of the spindle stroke. This motion would be useful, for example, in winding a four-pole stator. Also shown in the illustrated embodiments is a second spindle operating shaft mounted for rotary and linear motion parallel to the first shaft and connected thereto by gears having a size ratio such that the second spindle operating shaft will rock 180° between the axial portions of its stroke, thus being useful in winding a two-pole rotor.

Referring more particularly to the drawings, a stator of an electrical machine, such as a generator or motor, is generally indicated at 11, the stator having four inwardly extending poles 12, 13, 14 and 15. Coils 16 through 19 are to be wound on poles 12 to 15 respectively, these coils being formed from four separate strands of wire. A hollow spindle 21 has the four strands of wire within it, and they extend to the end of the spindle where they are led outwardly through four radially extending hollow needles 22.

The four poles have closely adjacent ends, and the needles must pass between these ends as the coils are being wound and then moved arcuately 90° so that the needles may pass between the adjacent pair of coil ends going in the other direction.

Referring now to FIGURES 3 and 4, the motion transfer mechanism comprises a frame generally indicated at 23 having upper and lower members 24 and 25, respectively, these members being connected by parallel frame members 26 and 27 at the forward end thereof and a rear frame member 28. A cross member 29 extends between members 26 and 27. Members 28 and 29 carry coaxial bearings 31 and 32, respectively, and a crankshaft 33 is rotatably mounted in these bearings and extends from opposite sides thereof. A belt drive pulley 34 is mounted on shaft 33 outwardly of member 28, and a crank 35 is secured to the end of shaft 33 extending outwardly from member 29.

Crank 35 extends in both directions from shaft 33, and one end carries a counterweight 36. The other end carries a block generally indicated at 37. For convenience, this block is made in two halves united by bolts 38. The block has a guide slot generally indicated at 39. This slot is of cross-sectional shape which is partly circular but is open toward the outer end 41 of the block facing away from shaft 33.

One section 42 of slot 39 extends radially with respect to the axis of shaft 33, this portion being open at the end facing the shaft axis. The other section 43 of slot 39 extends substantially parallel to the axis of shaft 33, and toward the shaft. Although the outer portion of the slot surface is curved between sections 42 and 43, the inner portion has a sharp break at the plane of symmetry, as indicated at 44, although this break is not sharp away from the plane of symmetry, in order to accommodate the spherical member described below.

A pair of extensions 45 and 46 extend in parallel relation from frame members 24 and 25 respectively, past crank arm 35, and a spindle operating shaft 47 is supported by members 45 and 46 for both rotational and axial movement. For this purpose, bearings 48 and 49 are provided in members 45 and 46 respectively. The axis of shaft 47 is perpendicular to and intersects an imaginary extension of the axis of shaft 33.

Spindle 21 is secured to spindle operating shaft 47 as an upward extension thereof, and the four wires for coils 16 through 19 may be fed upwardly through shaft 47 and spindle 21 from supply spools (not shown). The spindle may of course extend in the opposite direction if desired.

An arm 51 is secured to shaft 47 between members 45 and 46 and extends at right angles thereto. The outer end of this arm has a spherical member or ball 52 with flat mounting surfaces on opposite sides thereof, as seen in FIGURE 4. The diameter of ball 52 is such that it fits without appreciable play within slot 39 while at the same time free rotary and translatory movement within the slot is permitted, as controlled by the relative positions of the parts. Arm 51 extends through the opening in surface 41 of block 37 into slot 39. The distance of the axis of shaft 47 from the axis of portion 42 of slot 39, measured parallel to the axis of shaft 33, is such that arm 51 (and therefore shaft 47) will be rocked back and forth through an arc of 90° for each revolution of shaft 33, as described below.

In order to operate a spindle which must rock through an arc of 180°, another spindle operating shaft 53 is provided. Shaft 53 is parallel to shaft 47 and is supported for rotational and axial movement by bearings 54 and 55 carried by members 45 and 46 respectively. Shaft 53 is hollow, and like shaft 47, may be used to support a spindle similar to spindle 21.

A gear segment 56 is secured to shaft 47 and meshes with a gear 57 carried by shaft 53. Gear segment 56 has retaining members 58 and 59 thereon which engage the opposite sides of gear 57, so that axial movement of shaft 47 will result in corresponding axial movement of shaft 53. To obtain a 180° rocking movement of shaft 53, the gear ratio between gears 56 and 57 may be 1:2; that is, the pitch diameter of gear segment 56 will be twice that of gear segment 57, so that when gear 56 rocks 90°, it will rock gear 57 180°.

Alternatively, as shown in FIGURE 4, a fixed bar 58 could be provided in place of movable shaft 47, with the movable spindle operating shaft comprising a sleeve 59 slidably and rotatably mounted on bar 58, arm 51 being secured to sleeve 59. Gear segment 56 is also secured to sleeve 59, with guards 61 and 62 in this case being secured on the opposite sides of gear 57 and engaging gear segment 56, so that shaft 53 will have an axial movement corresponding to that of sleeve 59.

Figure 8:
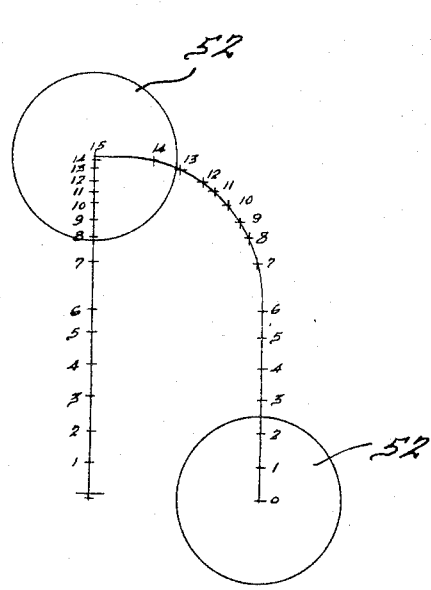
Figure 9:
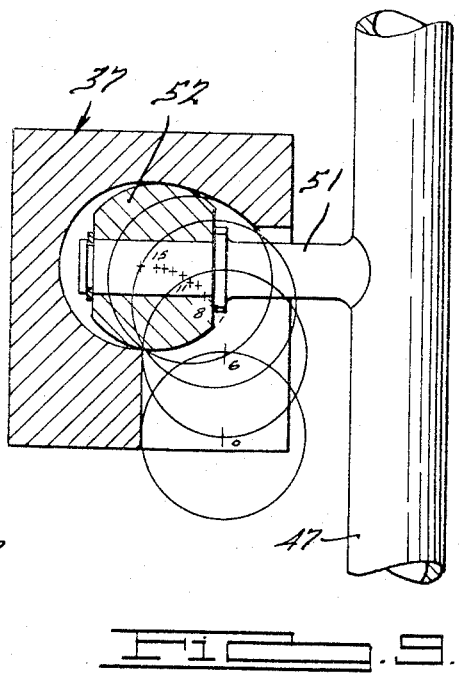

The operation of the unit may perhaps best be explained with respect to FIGURES 8, 9 and 10. These figures show the relative positions of the center of ball 52, as seen from various positions during one-quarter of its complete stroke. Starting with the zero position, at which time crank 35 extends at right angles to the axis of shaft 47, ball 52 will be disposed in an intermediate portion of slot section 42. As crank 35 rotates, block 37 will follow a circular path with the axis of slot section 42 moving in a plane at right angles to the axis of shaft 33. Ball 52 will move in this plane also, traveling toward the juncture of sections 42 and 43 of slot 39. Since ball 52 must remain a fixed distance from shaft 47, and in view of the fact that it is constrained to move in the aforementioned plane, its travel from stations zero to 6 will be in a straight line. Shaft 47 and therefore spindle 21 will also have substantially pure axial movement between these two stations.

As will be seen in FIGURE 9, ball 52 at station 6 will begin to enter the curved transitional portion of the slot which leads to section 43. As block 37 continues to rotate, ball 52 will move out of the aforementioned plane and pass along the transitional slot section. The result will be that shaft 47 will have a combined linear and rotational movement, with the linear movement being progressively smaller and the rotational movement progressively greater for equal angular increments of movement of crank 35. Between stations 14 and 15, the movement of shaft 47 will be almost entirely rotational.

The remaining three-quarters of the stroke will be evident from the aforementioned description. Two stroke portions in the complete cycle will be linear and of relatively great length, and two will be combined linear and arcuate movement portions, the linear components of these last-mentioned portions being short compared with lengths of the straight stroke portions.

If shaft 53 is being used, the stroke will be analogous to that described with respect to shaft 47, except that the directions of rotation will be opposite to those of shaft 47 because of the gear connection, and the arcuate stroke portions will cover twice the angular distance, or 180°.

In the case of FIGURE 4, the movement will be the same as that of FIGURE 3 except that sleeve 59 will carry out the same motion as shaft 47 in FIGURE 3.

It has been found that the mechanism described above is capable of very high speed operation, and because of the fact that there are basically only two moving parts, it is quite reliable and trouble-free in use.

As pointed out above, the formation of a sharp corner at the plane of symmetry in the transitional section of the slot is of advantage in preventing play between the ball and slot. Another advantage of this construction is to keep the translatory or linear travel of shaft 47 or 53 at a minimum during the rocking portions of its movement.

The magnitude of the rotational movement of the spindle may be varied by varying the length of arm 51, that is, the distance between the axis of slot section 42 and the axis of shaft 47. The length of the straight stroke portions may be varied by varying the radial distance between the axis of shaft 33 and block 37. The further out block 37 is placed with respect to the crankshaft axis, the longer will be the straight portions of the spindle stroke, and conversely, moving the block inwardly toward the crankshaft axis will shorten the straight stroke portions.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a motion transfer mechanism, a crankshaft, means supporting said crankshaft for rotation, a crank on said crankshaft, a slotted member on said crank and rotatable therewith, the slot in said member having an outwardly extending radial section and a section extending transversely from the outer end of said radial section, an operating shaft supported for rotary and linear motion on an axis at right angles to the axis of said crankshaft, an arm fixed to and extending transversely from said operating shaft, and a member secured to the outer end of said arm and disposed within said slot, the axis of said operating shaft being spaced from the axis of said radial slot section, whereby continuous rotation of said crankshaft will cause alternate linear and arcuate movement of said operating shaft.

2. In a motion transfer mechanism, a crankshaft, means supporting said crankshaft for rotation, a crank on said crankshaft, a slotted member on said crank and rotatable therewith, the slot in said member having an outwardly extending radial section and a section extending transversely from the outer end of said radial section, an operating shaft supported for rotary and linear motion on an axis at right angles to the axis of said crankshaft, an arm fixed to and extending transversely from said operating shaft, a spherical member secured to the outer end of said arm and disposed within said slot, the slot surface being so shaped as to retain said spherical member without substantial play and having a curved transitional section between the radial and transverse sections thereof, said transitional section curving away from said operating shaft, and a clearance opening for said arm extending from the surface of said slotted member facing said shaft to said slot, the axis of said operating shaft being spaced from the axis of said radial slot section, whereby continuous rotation of said crankshaft will cause alternate linear and arcuate movement of said operating shaft.

3. In a motion transfer mechanism, a crankshaft, means supporting said crankshaft for rotation, a crank on said crankshaft, a slotted member on said crank and rotatable therewith, the slot in said member having an outwardly extending radial section and a section extending transversely from the outer end of said radial section, an operating shaft supported for rotary and linear motion on an axis at right angles to the axis of said crankshaft, an arm fixed to and extending transversely from said operating shaft, a spherical member secured to the outer end of said arm and disposed within said slot, the slot surface being so shaped as to retain said spherical member without substantial play and having a curved transitional section between the radial and transverse sections thereof, said transitional section curving away from said operating shaft, the inner juncture between said radial and transverse slot sections being relatively sharp at the plane of symmetry of the slot, and a clearance opening for said arm extending from the surface of said slotted member facing said shaft to said slot, the axis of said operating shaft being spaced from the axis of said radial slot section, whereby continuous rotation of said crankshaft will cause alternate linear and arcuate movement of said operating shaft.

4. In a motion transfer mechanism, a crankshaft, means supporting said crankshaft for rotation, a crank on said crankshaft, a slotted member on said crank and rotatable therewith, a counterweight on said crank opposite said slotted member, the slot in said member having an outwardly extending radial section and a section extending transversely from the outer end of said radial section, an operating shaft supported for rotary and linear motion on an axis at right angles to the axis of said crankshaft, an arm fixed to and extending transversely from said operating shaft, a spherical member secured to the outer end of said arm and disposed within said slot, the slot surface being so shaped as to retain said spherical member without substantial play and having a curved transitional section between the radial and transverse sections thereof, said transitional section curving away from said operating shaft, and a clearance opening for said arm extending from the surface of said slotted member facing said shaft to said slot, the axis of said operating shaft being spaced from the axis of said radial slot section, whereby continuous rotation of said crankshaft will cause alternate linear and arcuate movement of said operating shaft.

5. In a motion transfer mechanism, a crankshaft, means supporting said crankshaft for rotation, a crank on said crankshaft, a slotted member on said crank and rotatable therewith, the slot in said member having an outwardly extending radial section and a section extending traversely from the outer end of said radial section, an operating shaft supported for rotary and linear motion on an axis at right angles to the axis of said crankshaft, an arm fixed to and extending transversely from said operating shaft, a spherical member secured to the outer end of said arm and disposd within said slot, the slot surface being so shaped as to retain said spherical member without substantial play and having a curved transitional section between the radial and transverse sections thereof, said transitional section curving away from said operating shaft, the inner juncture between said radial and transverse slot sections being relatively sharp at the plane of symmetry of the slot, and a clearance opening for said arm extending from the surface of said slotted member facing said shaft to said slot, the axis of said operating shaft being spaced from the axis of said radial slot section, whereby continous rotation of said crankshaft will cause alternate linear and arcuate movement of said operating shaft, the relative positions of the parts being such that said operating shaft will rotate through an angle of substantially 90° between successive linear stroke portions.

6. The combination according to claim 5, further provided with a second operating shaft parallel to said first operating shaft supported for rotational and linear movement, gears connecting said two operating shafts, and means preventing relative linear movement between said operating shafts, whereby the rotational movement of said second operating shaft between successive linear strokes will be different than that of said first operating shaft.

References Cited by the Examiner
UNITED STATES PATENTS

| | | | |
|---|---|---|---|
| 126,052 | 4/1872 | Harrison | 74—23 |
| 865,958 | 9/1907 | Stanfield | 74—23 |
| 1,776,982 | 9/1930 | Ricardo et al. | 74—23 |
| 2,940,325 | 6/1960 | Nakesch | 74—603 X |

FRED C. MATTERN, JR., *Primary Examiner.*

MILTON KAUFMAN, *Examiner.*

D. H. THIEL, *Assistant Examiner.*